United States Patent
Yoshimura et al.

(10) Patent No.: US 6,769,481 B2
(45) Date of Patent: Aug. 3, 2004

(54) OUTDOOR HEAT EXCHANGER UNIT, OUTDOOR UNIT, AND GAS HEAT PUMP TYPE AIR CONDITIONER

(75) Inventors: Atsushi Yoshimura, Nishi-kasugai-gun (JP); Hideaki Kasahara, Nishi-kasugai-gun (JP); Takaaki Ohtsuka, Nishi-kasugai-gun (JP); Jiro Tanaka, Nishi-kasugai-gun (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 09/983,936

(22) Filed: Oct. 26, 2001

(65) Prior Publication Data

US 2002/0050351 A1 May 2, 2002

(30) Foreign Application Priority Data

Oct. 30, 2000 (JP) ........................................ 2000-331442

(51) Int. Cl.⁷ ........................... F25B 27/00; F25B 29/00; F25B 27/02
(52) U.S. Cl. ....................... 165/240; 165/231; 62/238.6; 62/238.7; 62/323.1; 62/324.1; 237/2 B
(58) Field of Search ............................... 62/323.1, 238.7, 62/238.6, 324.1; 165/240, 231; 237/2 B

(56) References Cited

U.S. PATENT DOCUMENTS

| | | | | |
|---|---|---|---|---|
| 3,139,924 A | * | 7/1964 | Schreiner | 62/323.1 |
| 3,803,865 A | * | 4/1974 | Newton | 62/217 |
| 5,000,011 A | * | 3/1991 | Hayakawa | 62/323.1 |
| 6,425,257 B1 | * | 7/2002 | Ohseki et al. | 62/323.1 |

FOREIGN PATENT DOCUMENTS

| JP | 51-142146 | * | 12/1976 | |
|---|---|---|---|---|
| JP | 0164239 | * | 10/1982 | 62/238.7 |
| JP | 0164240 | * | 10/1982 | 62/238.7 |
| JP | 57-161437 | * | 10/1982 | 62/238.7 |
| JP | 57-161438 | * | 10/1982 | 62/238.7 |
| JP | 57-164243 | * | 10/1982 | 62/238.7 |
| JP | 62-96129 | * | 5/1987 | 237/12.3 A |
| JP | 8-296929 | * | 11/1996 | |
| JP | 9-61017 | * | 3/1997 | |
| JP | 2000-62446 | * | 2/2000 | |

* cited by examiner

Primary Examiner—John K. Ford
(74) Attorney, Agent, or Firm—Oblon, Spivak, McClelland, Maier & Neustadt, P.C.

(57) ABSTRACT

An object of the present invention is to provide an outdoor heat exchanger unit which is hardly effected adverse effects of the gas engine waste heat during the cooling operation and which can improve an efficiency of the refrigerant cycle, and which can improve the heating ability by utilizing the gas engine waste heat; an outdoor unit comprising the outdoor heat exchanger unit; and an air conditioner comprising the outdoor heat exchanger unit; in order to achieve the object, the present invention provide an outdoor heat exchanger unit for a gas heat pump type air conditioner, in which a compressor for compressing a refrigerant is driven by a gas engine, and which comprises a heat pump for utilizing waste heat of said gas engine to perform a heating and a cooling operations: wherein said outdoor heat exchanger unit comprises a radiator provided in a cooling water system in which cooling water for said gas engine circulates and an outdoor heat exchanger apparatus provided in a refrigerant circuit in which said refrigerant circulates; said radiator and said outdoor heat exchanger apparatus are arranged in series in the flow direction of an outdoor air introduced in said outdoor heat exchanger unit; said radiator is positioned downstream with respect to said outdoor heat exchanger apparatus in the flow direction of an outdoor air introduced in said outdoor heat exchanger unit; and an interval is between said radiator and said outdoor heat exchanger apparatus.

7 Claims, 8 Drawing Sheets

FLOW DIRECTION OF INTRODUCED AIR
(DURING THE COOLING OPERATION) →

COOLING OPERATION
(NORMAL MODE OF OUTDOOR FAN)

HEATING OPERATION
(REVERSE MODE OF OUTDOOR FAN)

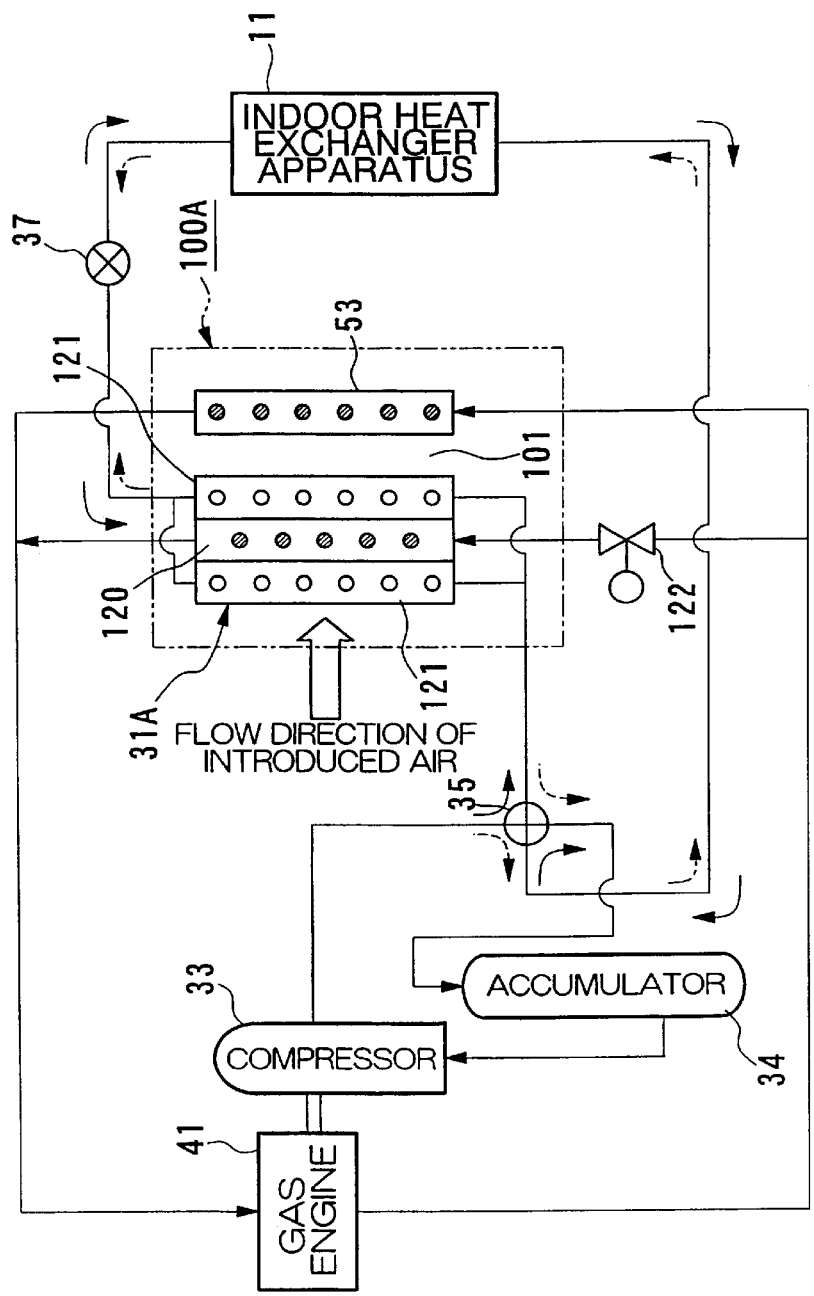

OUTDOOR HEAT EXCHANGER UNIT, OUTDOOR UNIT, AND GAS HEAT PUMP TYPE AIR CONDITIONER

BACKGROUND OF THE INVENTION

1. Field of the Invention

The present invention relates to a gas heat pump type air conditioner, in which a compressor for compressing a refrigerant is driven by a gas engine, and which uses waste heat of the gas engine as a heat source for a liquid refrigerant during the heating operation, and an outdoor heat exchanger unit and an outdoor unit, which are suitably used for the gas heat pump type air conditioner.

2. Description of the Related Art

An air conditioner, in which a heat pump is used for cooling and heating a chamber, is provided with a refrigerant circuit comprising an indoor heat exchanger apparatus, a compressor, an outdoor heat exchanger apparatus, an expansion valve, etc. When the refrigerant circulates in the refrigerant circuit and exchanges heat with air in the indoor heat exchanger apparatus and the outdoor heat exchanger apparatus, the chamber is heated or cooled. In general, the refrigerant absorbs heat from the air in the outdoor heat exchanger apparatus during the heating operation. However, not only the outdoor heat exchanger apparatus but also a refrigerant heat apparatus for heating the refrigerant directly is sometimes provided in the refrigerant circuit.

In recent years, an air conditioner has been suggested, which comprises a gas engine, instead of an ordinary motor, as a driving source for the compressor provided in the refrigerant circuit. An air conditioner utilizing a gas engine is called a gas heat pump type air conditioner (abbreviated as "GHP" below). The GHP can use gas, which is relatively cheap, as fuel; therefore, the running cost thereof can be reduced, compared with an air conditioner comprising a compressor driven by the ordinary motor (abbreviated as "EHP" below).

Moreover, when waste heat of gas at a high temperature discharged from the gas engine during the heating operation is used as the heat source for the refrigerant in the GHP, the heating ability can be improved, and the use efficiency of energy can also be improved. When the temperature of the outdoor air is low, the heating ability of the GHP is 1.2 to 1.5 times as large as the heating ability of the EHP. In addition, when the waste heat of the gas discharged from the gas engine is used in the GHP, the GHP does not require a special device, such as the refrigerant heating device explained above.

Furthermore, the GHP can utilize the engine waste heat to defrost the outdoor heat exchanger apparatus during the heating operation. In general, the EHP defrosts the outdoor heat exchanger apparatus by stopping the heating operation and temporarily performing the cooling operation. That is, when the EHP defrosts, cooled air is introduced into the chamber. Therefore, a person in the chamber feels unpleasant. In contrast, the GHP can utilize the waste heat, and it can continuously perform the heating operation without such a problem which is caused by the EHP.

The GHP has many advantages as explained above; however, it also has the following problems.

FIG. 8 shows a conventional outdoor heat exchanger unit. In FIG. 8, reference number 23 denotes a heat exchanger chamber which is positioned in the upper portion of an outdoor unit, 81 denotes an outdoor fan for introducing outdoor air, and 2 denotes an outdoor heat exchanger unit for exchanging heat between the refrigerant and the outdoor air. The outdoor heat exchanger unit 2 comprises three heat exchangers arranged in series in the flow direction of the outdoor air. Specifically, a radiator 53 is arranged in the center of the outdoor heat exchanger unit 2, and two heat exchangers 31 and 31 sandwich the radiator 53 so as to be positioned upstream and downstream of the flow direction of the outdoor air with respect to the radiator 53. The radiator 53 belongs to a cooling water circuit in which cooling water for the gas engine circulates. As shown in FIG. 8B, the radiator 53 and the two heat exchangers 31 and 31 divide a fin 3. In other words, fins of the radiator 53 and the heat exchangers 31 and 31 are integrated as the fin 3.

In order to improve the heating ability when the temperature of the outdoor air is low, the outdoor heat exchanger unit 2 adopts such a three heat exchanger sandwiched structure. The outdoor heat exchanger unit 2 functions as an evaporator during the heating operation. In the outdoor heat exchanger unit 2, the heat exchangers 31 and 31 can absorb the waste heat radiated from the radiator 53. Therefore, even when the temperature of the outdoor air is low, the outdoor heat exchanger unit 2 can obtain heat required for evaporating the refrigerant from the waste heat of the gas engine.

In contrast, the outdoor heat exchanger unit 2 functions as a condenser during the cooling operation The waste heat of the gas engine, which is radiated from the radiator 53, decreases the efficiency of the refrigerant cycle. In other words, the heat exchangers 31 and 31 as condensers are effected by the waste heat from the radiator 53, and the pressure in the refrigerant cycle increases. Therefore, a large amount of electric power is required to drive the compressor, and the coefficient of performance (COP) of the air conditioner decreases. Moreover, the COP is calculated from the following formula: COP=Qe/L, wherein Qe is the refrigeration capacity, and L is the electric power required for the compressor. Therefore, an outdoor heat exchanger unit has been desired, which can improve the efficiency of the refrigerant cycle without being effected by the engine waste heat during the cooling operation. Moreover, an outdoor heat exchanger unit has also been desired which can improve the efficiency of the refrigerant cycle during the cooling operation and the heating ability by using the gas engine waste heat when the temperature of the outdoor air is low. Furthermore, the development of an outdoor unit comprising the outdoor heat exchanger unit and a GHP comprising the outdoor heat exchanger unit has also been desired.

Therefore, an object of the present invention is to provide: an outdoor heat exchanger unit which is hardly effected by the gas engine waste heat during the cooling operation thereby improving the efficiency of the refrigerant cycle, and which can improve the heating ability by utilizing the gas engine waste heat; an outdoor unit comprising the outdoor heat exchanger unit; and a GHP comprising the outdoor unit.

SUMMARY OF THE INVENTION

In order to achieve the object, the present invention provides an outdoor heat exchanger unit for a GHP, in which a compressor for compressing a refrigerant is driven by a gas engine, and which comprises a heat pump for utilizing waste heat of the gas engine to perform a heating and a cooling operations:

wherein the outdoor heat exchanger unit comprises a radiator provided in a cooling water system in which cooling water for the gas engine circulates and an outdoor heat exchanger apparatus provided in a refrigerant circuit in which the refrigerant circulates;

the radiator and the outdoor heat exchanger apparatus are arranged in series in the flow direction of an outdoor air introduced in the outdoor heat exchanger unit;

the radiator is positioned downstream with respect to the outdoor heat exchanger apparatus in the flow direction of an outdoor air introduced in the outdoor heat exchanger unit; and an interval is between the radiator and the outdoor heat exchanger apparatus.

In the outdoor heat exchanger unit, the interval is between the radiator and the outdoor heat exchanger apparatus; therefore, heat is not conducted between the outdoor heat exchanger apparatus and the radiator. Moreover, the radiator is positioned downstream with respect to the outdoor heat exchanger apparatus in the flow direction of an outdoor air introduced in the outdoor heat exchanger unit. Therefore, the outdoor air heated by the radiator does not pass through the outdoor heat exchanger apparatus. As a result, it is possible to prevent the outdoor heat exchanger apparatus from being effected by adverse effects of the waste heat of the gas engine during the cooling operation. Moreover, the COP can be improved.

In order to achieve the object, the present invention provides an outdoor unit for a GHP, in which a compressor for compressing a refrigerant is driven by a gas engine, and which comprises a heat pump for utilizing waste heat of the gas engine to perform a heating and a cooling operations:

wherein the outdoor unit comprises a gas engine portion comprising the gas engine, a cooling water system comprising a radiator, an exhaust gas system for introducing exhaust gas discharged from the gas engine into outside of the outdoor unit, and a fuel intake system for supplying fuel and air in the gas engine; and a refrigerant circuit comprising the compressor, an outdoor heat exchanger apparatus for exchanging heat between the refrigerant and air introduced therein, and an expansion valve for decompressing and expanding the refrigerant in a liquid state during the cooling operation; and an outdoor heat exchanger unit is provided in the outdoor unit, in which the radiator and the outdoor heat exchanger apparatus are arranged in series in the flow direction of an outdoor air introduced in the outdoor heat exchanger unit; the radiator is positioned downstream with respect to the outdoor heat exchanger apparatus in the flow direction of an outdoor air introduced in the outdoor heat exchanger unit; and an interval is between the radiator and the outdoor heat exchanger apparatus.

The outdoor unit comprises the outdoor heat exchanger unit in which the interval is between the radiator and the outdoor heat exchanger apparatus; therefore, heat is not conducted between the outdoor heat exchanger apparatus and the radiator. Moreover, the radiator is positioned downstream with respect to the outdoor heat exchanger apparatus in the flow direction of an outdoor air introduced in the outdoor heat exchanger unit. Therefore, the outdoor air heated by the radiator does not pass through the outdoor heat exchanger apparatus. As a result, it is possible to prevent the outdoor heat exchanger apparatus from being effected by adverse effects of the waste heat of the gas engine during the cooling operation. Moreover, the COP can be improved.

In order to achieve the object, the present invention provides a GHP, in which a compressor for compressing a refrigerant is driven by a gas engine, and which comprises a heat pump for utilizing waste heat of the gas engine to perform a heating and a cooling operations:

wherein the GHP comprises an outdoor unit and an indoor unit;

the outdoor unit comprises a gas engine portion comprising the gas engine, a cooling water system comprising a radiator, an exhaust gas system for introducing exhaust gas discharged from the gas engine into outside of the outdoor unit, and a fuel intake system for supplying fuel and air in the gas engine; a refrigerant circuit comprising the compressor, an outdoor heat exchanger apparatus for exchanging heat between the refrigerant and air introduced therein, and an expansion valve for decompressing and expanding the refrigerant in a liquid state during the cooling operation;

an outdoor heat exchanger unit is provided in the outdoor unit, in which the radiator and the outdoor heat exchanger apparatus are arranged in series in the flow direction of an outdoor air introduced in the outdoor heat exchanger unit; the radiator is positioned downstream with respect to the outdoor heat exchanger apparatus in the flow direction of an outdoor air introduced in the outdoor heat exchanger unit; and an interval is between the radiator and the outdoor heat exchanger apparatus; and an indoor unit comprises a fan for drawing indoor air and blowing out it from an opening, and an indoor heat exchanger apparatus for exchanging heat between the refrigerant supplied from the outdoor unit and the indoor air drawn by the fan.

The GHP comprises the outdoor unit provided with the outdoor heat exchanger unit in which the interval is between the radiator and the outdoor heat exchanger apparatus; therefore, heat is not conducted between the outdoor heat exchanger apparatus and the radiator. Moreover, the radiator is positioned downstream with respect to the outdoor heat exchanger apparatus in the flow direction of an outdoor air introduced in the outdoor heat exchanger unit. Therefore, the outdoor air heated by the radiator does not pass through the outdoor heat exchanger apparatus. As a result, it is possible to prevent the outdoor heat exchanger apparatus from being effected by adverse effects of the waste heat of the gas engine during the cooling operation. Moreover, the COP can be improved.

In the GHP, it is preferable that it further comprises a fan for introducing outdoor air into outdoor heat exchanger unit; the fan rotates in a normal mode so as to introduce outdoor air through the outdoor heat exchanger apparatus and radiator in turn during the cooling operation; and the fan rotates in a reverse mode so as to introduce outdoor air through the radiator and the outdoor heat exchanger apparatus in turn during the heating operation.

The GHP is not effected by adverse effects of the waste heat of the gas engine during the cooling operation. In contrast, the heating ability can be improved by utilizing the waste heat of the gas engine during the heating operation.

In the GHP, it is possible that it further comprises a water heat exchanger apparatus for absorbing waste heat of the gas engine from cooling water circulating in the cooling water system and evaporating the refrigerant; and a constant pressure expansion valve is used as the expansion valve.

According to the GHP, a pressure decrease in the circulating refrigerant can be prevented, and frost of the outdoor heat exchanger apparatus can be prevented. Therefore, when the efficiency of the gas engine is improved, and thereby the waste heat of the gas engine decreases; a decrease in the heating ability can be prevented.

In the GHP, it is preferable that the outdoor heat exchanger apparatus comprises at least three heat exchangers arranged in series in the flow direction of outdoor air introduced into an outdoor heat exchanger unit; at least one heat exchanger which is not arranged at both sides of the outdoor heat exchanger apparatus is a warm water heat exchanger belongs to the cooling water system; and the cooling water system further comprises a valve for selectively introducing cooling water of the gas engine into the warm water heat exchanger.

According to the GHP, the valve is closed during the cooling operation, and thereby the cooling water for the gas engine does not pass through the warm water heat exchanger. Therefore, the outdoor heat exchanger apparatus is not effected by adverse effects of the waste heat In contrast, during the heating operation, the valve is opened, and thereby the cooling water for the gas engine passes through the radiator and the warm water heat exchanger. Therefore, the refrigerant can absorb heat sufficient for evaporation from the waste heat of the cooling water for the gas engine.

Moreover, in the GHP, it is more preferable that the valve is operated so as to introduce the cooling water into the warm water heat exchanger depending on conditions under which frost is generated in the outdoor heat exchanger apparatus during the heating operation and temperature of outdoor air is low.

According to the GHP, it is possible to prevent the outdoor heat exchanger apparatus from frosting. Therefore, a decrease in the heating ability can be prevented.

BRIEF DESCRIPTION OF THE DRAWINGS

FIG. 7 is a block diagram showing a second embodiment of the GHP according to the present invention.

DETAILED DESCRIPTION OF THE PREFERRED EMBODIMENTS

Figure 1A:
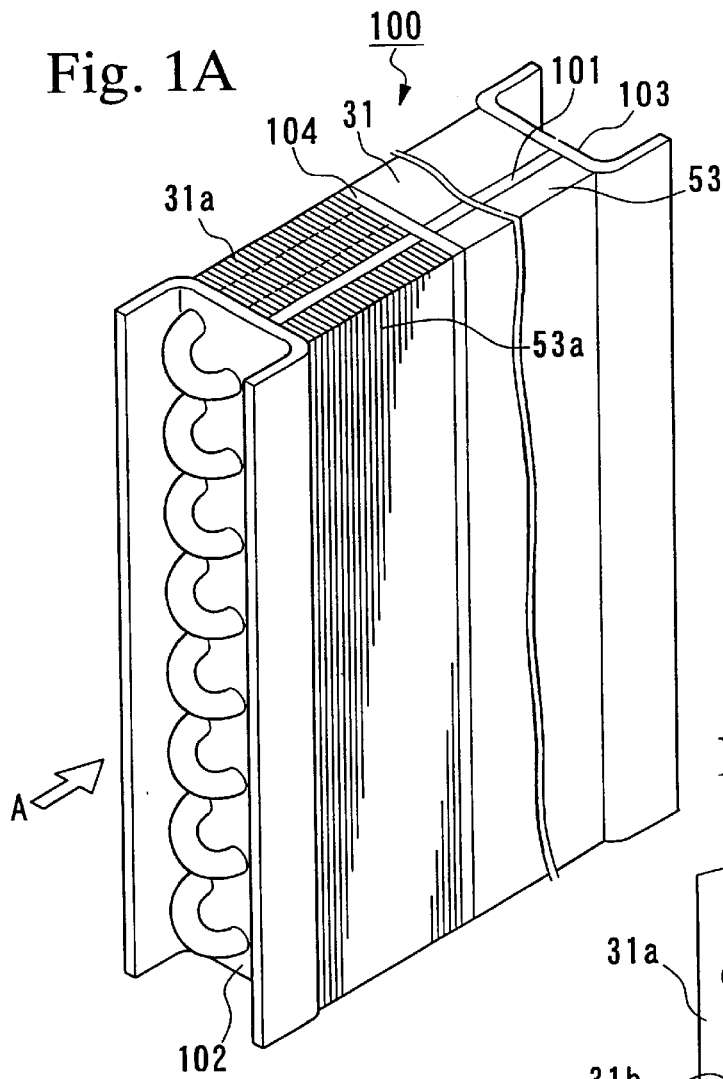
FIG. 1A is a perspective view showing a first embodiment of the outdoor heat exchanger unit according to the present invention.

Referring the FIGS. 1 to 7, preferred embodiments of the outdoor heat exchanger unit, the outdoor unit, and the GHP according to the present invention will be explained below.

A first embodiment of the present invention will be explained referring to FIGS. 1 to 6. FIG. 2 is a block diagram showing a first embodiment of the GHP. The GHP comprises an indoor unit 10 and an outdoor unit 20 as main components. The indoor unit 10 comprises an indoor heat exchanger apparatus 11. During the cooling operation, the indoor heat exchanger apparatus 11 evaporates a liquid refrigerant of low temperature and low pressure, and thereby absorbs heat from the indoor air, that is, it cools the indoor air. During the heating operation, the indoor heat exchanger apparatus 11 condenses and liquefies a gas refrigerant of high temperature and high pressure, and thereby discharges heat to the indoor air, that is, it warms the indoor air. Moreover, the indoor air is drawn into the indoor heat exchanger apparatus 11 by an indoor fan 12. After the indoor air exchanges heat with a refrigerant in the indoor heat exchanger apparatus 11, it is blown out into a chamber.

The outdoor unit 20 comprises a refrigerant circuit 30 and a gas engine portion 40 provided with a gas engine 41 and auxiliary equipment, as main components.

The refrigerant circuit 30 comprises an outdoor heat exchanger apparatus 31, a water heat exchanger apparatus 32, a compressor 33, an accumulator 34, a four-way valve 35, an oil separator 36, an expansion valve 37, and a three-way valve 38.

During the cooling operation, the outdoor heat exchanger apparatus 31 condenses and liquefies a gas refrigerant of high temperature and high pressure, that is, it discharges heat of the gas refrigerant into the outdoor air. During the heating operation, the outdoor heat exchanger apparatus 31 evaporates a liquid refrigerant of low temperature and low pressure, that is, it absorbs heat from the outdoor air. In other words, the function of the outdoor heat exchanger apparatus 31 during the heating operation is the same as the function of the indoor heat exchanger apparatus 11 during the cooling operation. Moreover, the function of the outdoor heat exchanger apparatus 31 during the cooling operation is the same as the function of the indoor heat exchanger apparatus 11 during the heating operation.

In the water heat exchanger apparatus 32, the refrigerant absorbs waste heat from the cooling water for the gas engine 41. That is, the refrigerant absorbs heat not only from the outside air in the outdoor heat exchanger apparatus 31 but also from the cooling water for the gas engine 41 in the water heat exchanger apparatus 32, during the heating operation. Therefore, the efficiency of the heating operation can be improved.

The compressor 33 compresses a gas refrigerant flowing therein from either the indoor heat exchanger apparatus 11 or the outdoor heat exchanger apparatus 31, and discharges the gas refrigerant as a gas refrigerant of high temperature and high pressure. Due to the functions of the compressor 33, even when the temperature of the outdoor air is high, the refrigerant can radiate heat into the outdoor air through the outdoor heat exchanger apparatus 31 during the cooling operation. In contrast, the refrigerant can give heat to the indoor air through the indoor heat exchanger apparatus 11 during the heating operation.

The accumulator 34 separates out a liquid component contained in the gas refrigerant flowing into the compressor 33, and accumulates a surplus refrigerant generated depending on the operation conditions of the indoor unit 10.

The four-way valve 35 selectively flows the gas refrigerant of high temperature and high pressure compressed in the compressor 33 into either the indoor heat exchanger apparatus 11 or the outdoor heat exchanger apparatus 31.

The oil separator 36 separates out an oil, such as a lubricating oil used in the compressor 33, which is contained in the refrigerant.

The expansion valve 37 decompresses and expands the liquid refrigerant of high temperature and high pressure flowing out from the outdoor heat exchanger apparatus 31, and thereby, changes the liquid refrigerant of high temperature and high pressure into a liquid refrigerant of low temperature and low pressure during the cooling operation.

The three-way valve 38 introduces the refrigerant into the water heat exchanger apparatus 32 during the heating operation, and introduces the refrigerant into a by-pass circuit 30a during the cooling operation.

The gas engine portion 40 comprises the gas engine 41 as a main component, and further comprises a cooling water system 50, an exhaust gas system 60, a fuel intake system 70, and an engine oil system which is not shown in the figures.

The gas engine 41 connects to the compressor 33 provided in the refrigerant circuit 30 by a shaft or a belt; therefore, a motive power force is transferred from the gas engine 41 to the compressor 33.

The cooling water system 50 comprises a water pump 51, a reserve tank 52, and a radiator 53, and it cools the gas engine 41 by cooling water circulating in a circuit comprising these components 51, 52, and 53.

The water pump 51 circulates the cooling water for the gas engine 41 in the circuit.

The reserve tank 52 temporarily accumulates surplus cooling water circulating in the circuit, or supplies the surplus cooling water into the circuit when the cooling water is insufficient.

The radiator 53 is integrated with the outdoor heat exchanger apparatus 31. The radiator 53 radiates heat of the cooling water, which is absorbed from the gas engine 41, into the outdoor air. Moreover, the unit, in which the radiator 53 and the outdoor heat exchanger apparatus 31 are integrated, is called an outdoor heat exchanger unit 100 below. The detailed structure of the outdoor heat exchanger unit 100 will be explained below.

An exhaust gas heat exchanger 54 is also provided in the cooling water system 50. In the exhaust gas heat exchanger 54, the cooling water absorbs waste heat of an exhaust gas exhausted from the gas engine 41. The waterheat exchanger apparatus 32, which was explained above, also belongs to the cooling water system 50. That is, the water heat exchanger apparatus 32 belongs to both the refrigerant circuit 30 and the cooling water system 50. Due to this construction, the cooling water absorbs heat from not only the gas engine 41, but also the exhaust gas. The waste heat absorbed in the cooling water is conducted to the refrigerant in the water heat exchanger apparatus 32.

The exhaust gas system 60 comprises a muffler 61, an exhaust top 62, and a drain filter 63. The exhaust gas system 60 releases the gas exhausted from the gas engine 41 to the outside of the outdoor unit 20.

The muffler 61 absorbs noise generated when exhausting the gas from the gas engine 41.

The exhaust top 62 separates out moisture contained in the exhaust gas, and prevents the moisture from being discharged to the outside of the outdoor unit 20. The exhaust top 62 can also be called an exhaust gas separator.

The drain filter 63 temporarily accumulates the moisture separated from the exhaust gas in the exhaust top 62. Moreover, a neutralizer is contained in the drain filter 63, in order to neutralize the moisture contained in the exhaust gas, which is a strong acid, in general.

The fuel intake system 70 comprises a gas regulator 71, an electrical valve 72, an intake chamber 73, and an air cleaner 74. The fuel intake system 70 supplies fuel and air into the gas engine 41.

The gas regulator 71 adjusts the delivery pressure of the gas supplied from the outside of the outdoor unit 20 via the electrical valve 72.

The intake chamber 73 introduces air for combustion from the outside of the outdoor unit 20. Moreover, the intake chamber 73 also prevents the generation of noise when the intake chamber 73 takes in air from the outside of the outdoor unit 20.

The air cleaner 74 cleans dust from the air taken in by the intake chamber 73.

As explained above, the gas and the air supplied from the outside of the outdoor unit 20 pass through the gas regulator 71 and the air cleaner 74, and then they are mixed. Thereafter, the mixture is sent into the gas engine 41 as fuel.

Figure 2:
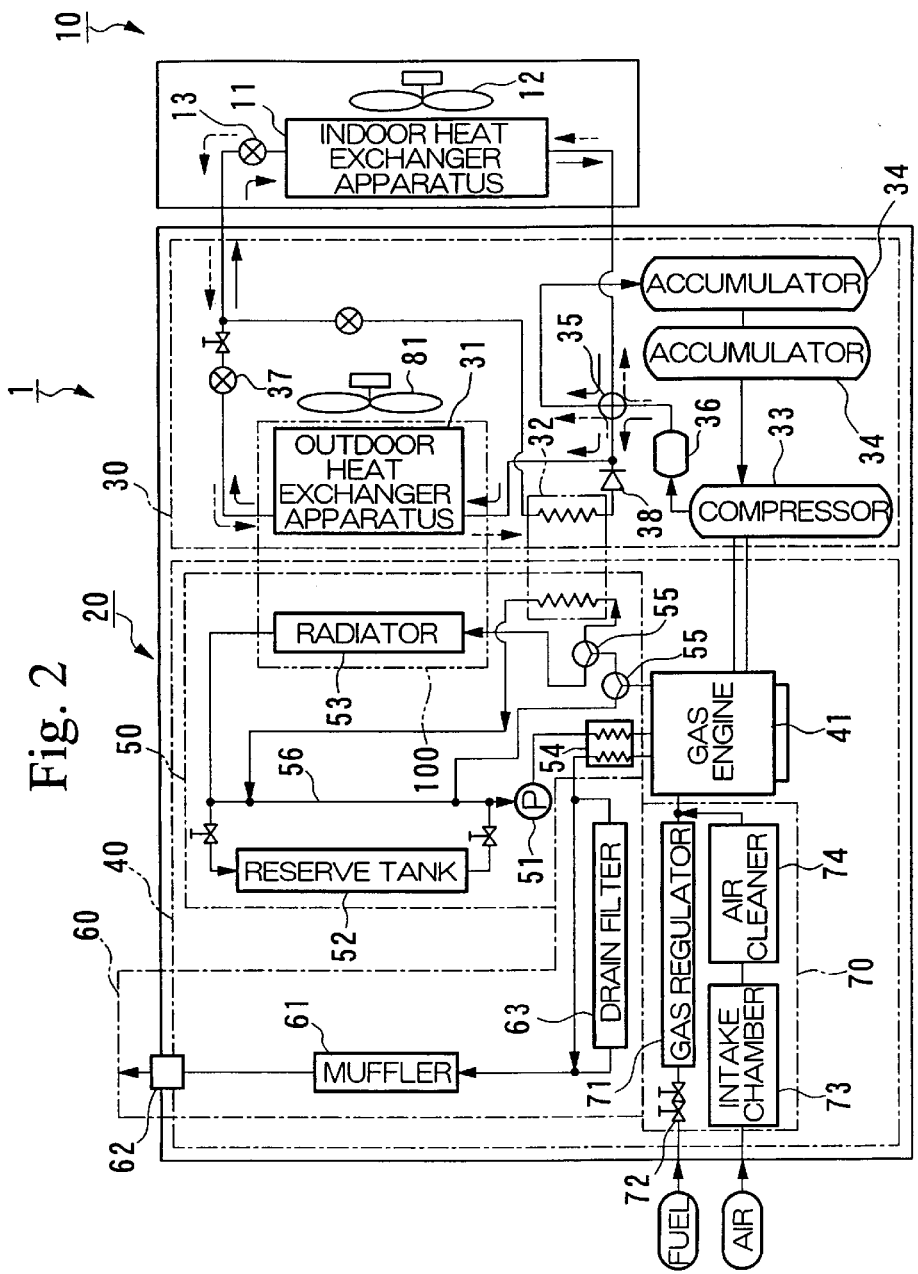
FIG. 2 is a block diagram showing a first embodiment of the GHP according to the present invention.
Figure 3:
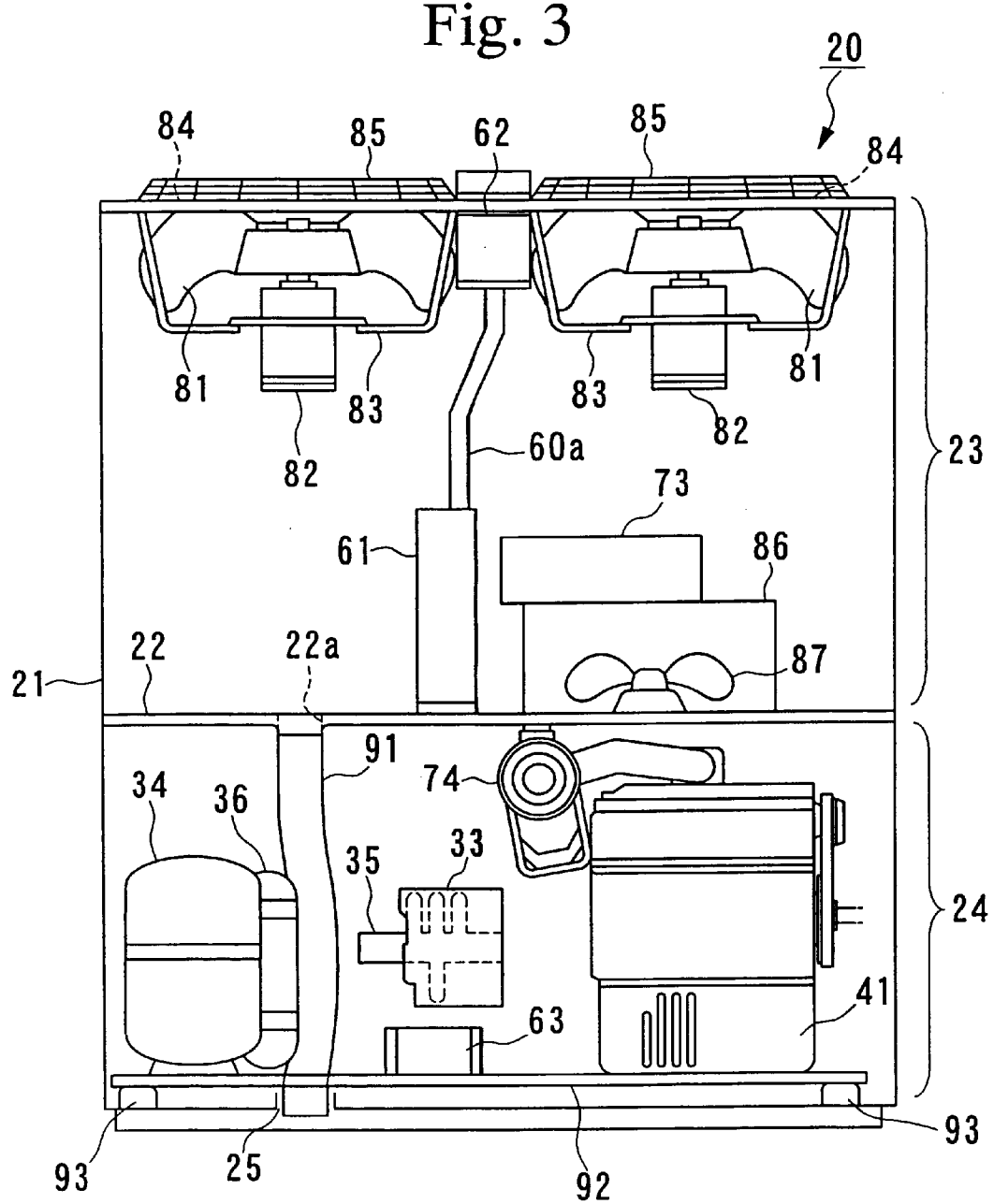
FIG. 3 shows an internal constitution of a first embodiment of the outdoor unit according to the present invention.
Figure 4:
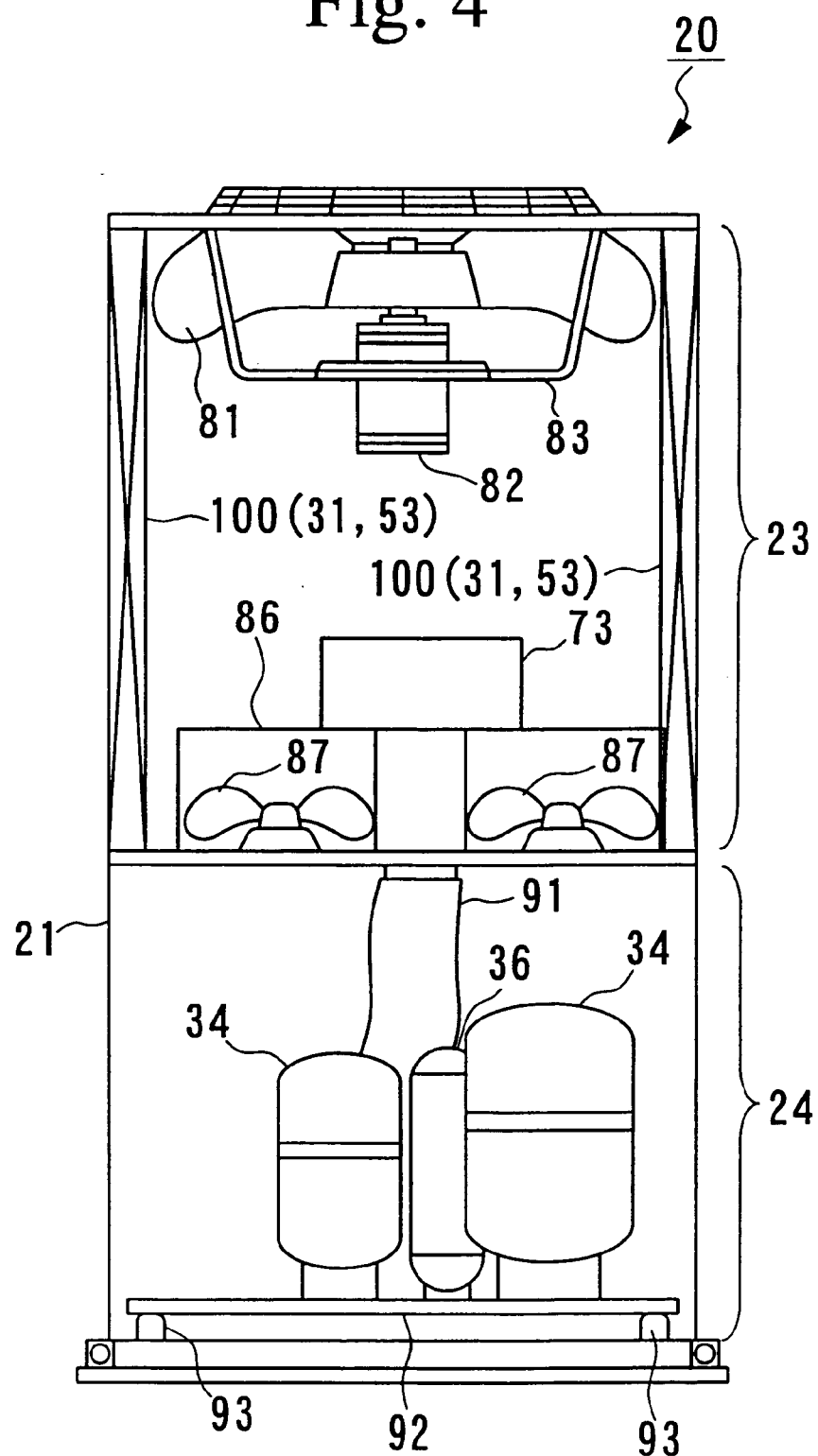
FIG. 4 shows a side view of the internal constitution of the outdoor unit shown in FIG. 3.

These devices and systems comprising the outdoor unit 20 are contained in an outdoor unit body 21, as shown in FIGS. 3 and 4. As shown in FIGS. 3 and 4, the inside of the outdoor unit body 21 is divided into top and bottom parts by a partition 22. Below, the top part of the outdoor unit body 21 is called a heat exchange chamber 23, and the bottom part thereof is called a machine chamber 24. Moreover, the pipes, which are explained referring to FIG. 2, are omitted in FIGS. 3 and 4.

First, the heat exchange chamber 23 will be explained below. In the heat exchange chamber 23, the outdoor heat exchanger unit 100, in which the outdoor heat exchanger apparatus 31 and the radiator 53 are integrated, is positioned so as to cover the front and the back faces of the outdoor unit body 21. In addition to the outdoor heat exchanger unit 100, for example, the muffler 61, the exhaust top 62, and the intake chamber 73 are positioned in the heat exchange chamber 23. Moreover, the muffler 61, the exhaust top 62, and a pipe 60a, which connects the muffler 61 and the exhaust top 62, are shown in FIG. 3; however, they are omitted in FIG. 4.

Outdoor fans 81 and 81, fan motors 82 and 82, and fan fixtures 83 and 83 are provided in the heat exchange chamber 23, in addition to the outdoor heat exchanger unit 100, the muffler 61, the exhaust top 62, etc. The outdoor fan 81 is provided with a power output shaft of the fan motor 82 fixed to the fan fixture 83 which is suspended from the ceiling of the outdoor unit body 21. Two sets comprising the outdoor fan 81, the fan motor 82, and the fan fixture 83 are provided in the heat exchange chamber 23 in this embodiment. Moreover, openings 84 and 84 for the outdoor fans 81 and 81 are provided at the ceiling of the outdoor unit body 21. Net covers 85 and 85 are provided at the openings 84 and 84. The outdoor fan 81 can change its rotation direction in response to the operation of the GHP 1. That is, the rotation direction of the outdoor fan 81 during the heating operation is different from that during the cooling operation. Thereby, the flow direction of the outdoor air introduced into the outdoor heat exchanger unit 100 can be changed; therefore, the operation of the outdoor heat exchanger apparatus 31 can be assisted.

Furthermore, two ventilation chambers 86 and 86 are provided on the partition 22, and ventilation fans 87 and 87 are provided in the ventilation chambers 86 and 86. The ventilation chamber 86 and the ventilation fan 87 introduce heat generated in the machine chamber 24 into the heat exchange chamber 23. Therefore, the air heated in the machine chamber 24, in which the gas engine 41 operates, is introduced into the heat exchange chamber 23 by the ventilation fan 87, and discharged to the outside of the outdoor unit body 21 by the outdoor fan 81.

The intake chambers 73 and 73 are positioned on the ventilation chambers 86 and 86. The air taken in by the intake chamber 73 passes through the ventilation chamber 86 and reaches the gas engine 41.

Next, the machine chamber 24 will be explained. Almost all of the devices and the systems comprising the GHP, which were explained referring to FIG. 2, are contained in the machine chamber 24. For example, FIGS. 3 and 4 show only the compressor 33, the accumulator 34, the four-way valve 35, and the oil separator 36, which belong to the refrigerant circuit 30; and the gas engine 41, the drain filter 63, and the air cleaner 74, which belong to the gas engine portion 40.

In addition to these devices, a drain pipe 91 is also provided in the machine chamber 24. The drain pipe 91 connects an opening 22a, which is formed at the partition 22, and an opening 25, which is formed at the floor of the outdoor unit body 21. The drain pipe 91 discharges rainwater, which falls to the outdoor unit body 21 through the opening 84 formed at the ceiling, into the outside of the outdoor unit body 21.

Moreover, a base plate 92 and vibration proof rubber parts 93 and 93 are provided in the machine chamber 24. The base plate 92 is substantially in a square shape, and it is used as a floor board on which to place the components comprising the refrigerant circuit 30 and the gas engine portion 40, which are in the machine chamber 24. The vibration proof rubber parts 93 and 93 are positioned at the four corners of the bottom surface of the base plate 92. The base plate 92 and the vibration proof rubber parts 93 and 93 prevent vibrations due to the refrigerant circuit 30 and the gas engine portion 40.

Below, the preferred embodiment of the outdoor heat exchanger unit 100 will be explained referring to FIGS. 1A and 1B.

As explained above, the outdoor heat exchanger apparatus 31, in which the refrigerant flows, and the radiator 53, in which the cooling water for the gas engine 41 flows, are integrated in the outdoor heat exchanger unit 100. The refrigerant and the cooling water exchange heat with the outdoor air introduced by the outdoor fan 81 into the outdoor heat exchanger unit 100. The outdoor heat exchanger apparatus 31 and the radiator 53 are arranged in series in the flow direction of the outdoor air. There is an interval 101 between the outdoor heat exchanger apparatus 31 and the radiator 53. In the outdoor heat exchanger unit 100 shown in FIG. 1B, the radiator 53 is arranged at the downstream side with respect to the outdoor heat exchanger apparatus 31 in the flow direction of the introduced air during the cooling operation. The preferable width of the interval 101 varies depending on various conditions; however, it is preferably about 2 mm.

Figure 1B:
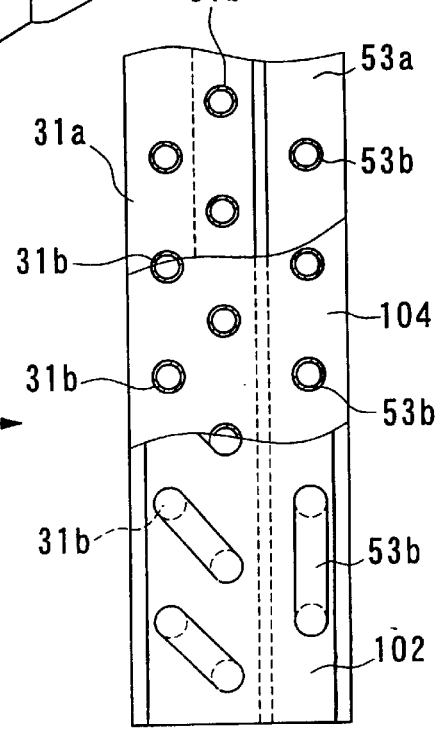
FIG. 1B shows the outdoor heat exchanger unit viewed from the direction indicated by the A-arrow in FIG. 1A.

As shown in FIG. 1A, the outdoor heat exchanger apparatus 31 and the radiator 53, each of which has individual fins, are integrated by fixing the right and the left ends thereof using end plates 102 and 103. In other words, the interval 101 is between the fins 31a of the outdoor heat exchanger apparatus 31 and the fins 53a of the radiator 53. These fins 31a and 53a are separated, and are individual. Heat cannot be conducted between the fins 31a and the fins 53a. Moreover, reference number 104 denotes intermediate girders. The intermediate girders 104 and 104 are positioned between the end plates 102 and 103 maintaining a suitable interval, if necessary. Moreover, reference number 31b denotes a copper pipe which is used as a refrigerant passage, and 53b denotes a copper pipe which is used as a cooling water passage.

Figure 6A:
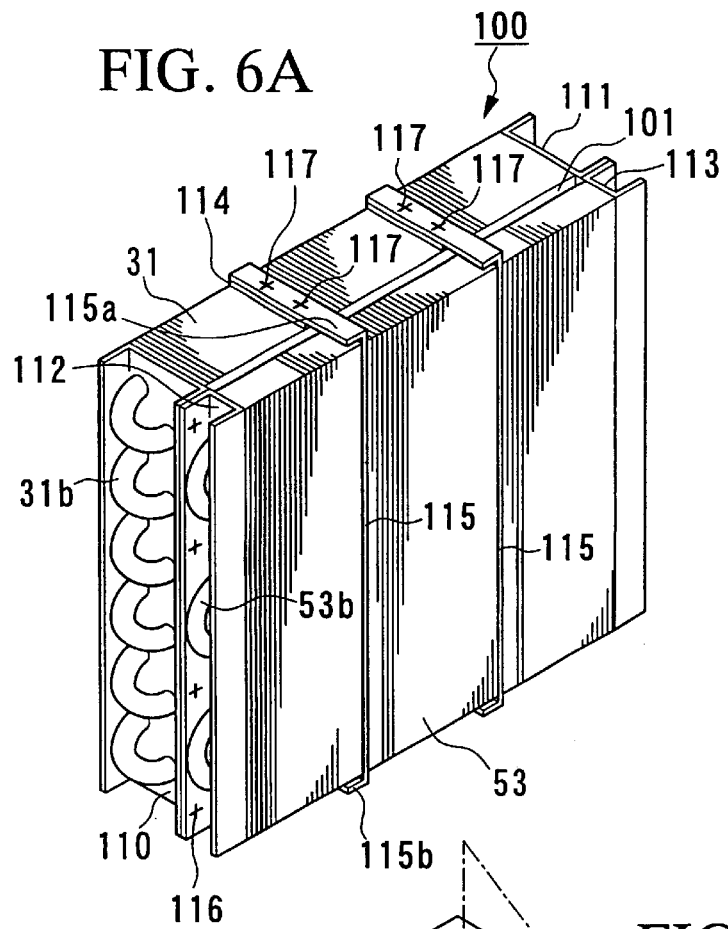
FIG. 6A is a perspective view showing another embodiment of the outdoor heat exchanger unit according to the present invention.
Figure 6B:
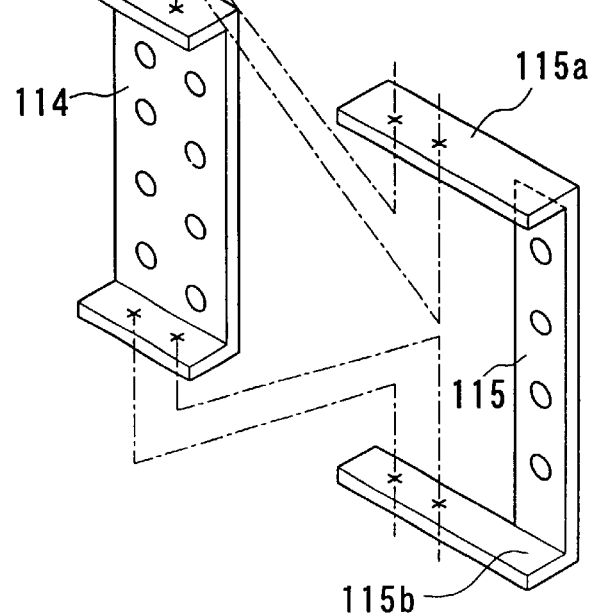
FIG. 6B shows a girder provided in the outdoor heat exchanger unit shown in FIG. 6A.
Figure 8A:
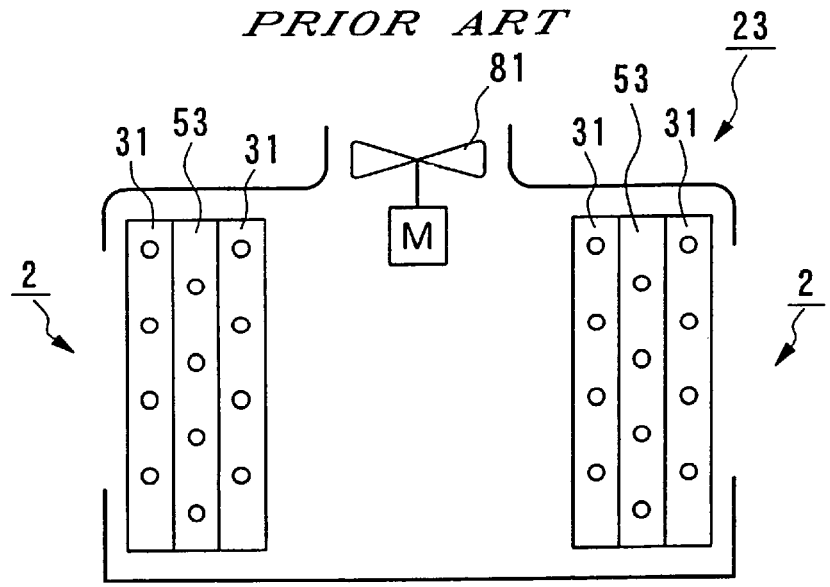
FIG. 8A is a schematic view showing the main portion of the conventional outdoor heat exchanger unit.
Figure 8B:
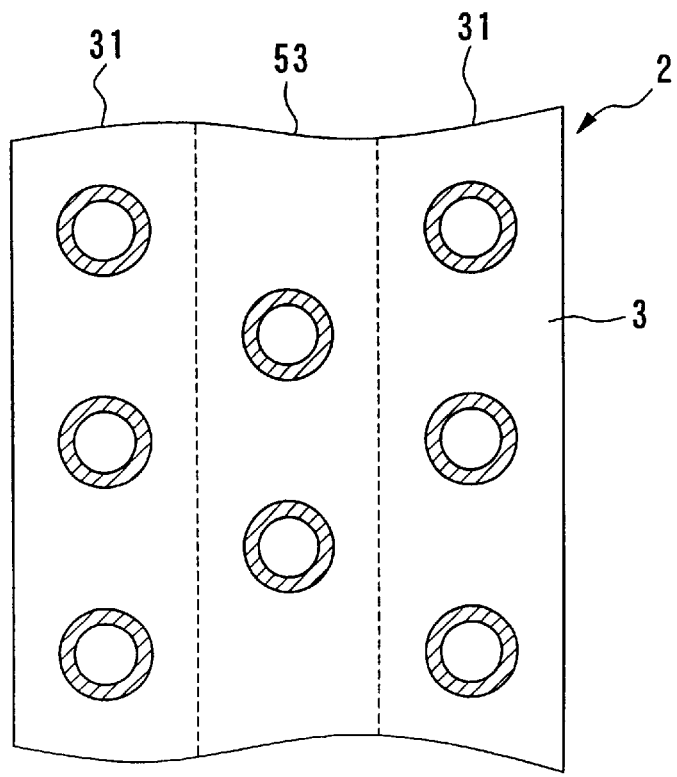
FIG. 8B is a partial enlarged view showing the fin provided in the conventional outdoor heat exchanger unit.

As explained above, the preferred embodiment of the outdoor heat exchanger unit 100, in which the outdoor heat exchanger apparatus 31 and the radiator 53 are integrated, is shown in FIG. 1. However, an outdoor heat exchanger unit 100, which is shown in FIG. 6, can also be suitably used.

In this outdoor heat exchanger unit 100, the outdoor heat exchanger apparatus 31 has a pair of end plates 110 and 111, and the radiator 53 also has a pair of end plates 112 and 113. These end plates 110, 111, 112, and 113 respectively have ribs. Intermediate girders 114 and 114, which comprise fixing plates at the upper and lower ends thereof, are interposed between the end plates 110 and 111. Intermediate girders 115 and 115, which comprise fixing plates 115a and 115b at the upper and lower ends thereof, are also interposed between the end plates 112 and 113. The fixing plates 115a and 115b, which are provided with the intermediate girder 115, are positioned perpendicular to the intermediate girder 115 and parallel to the end plates 112 and 113. The fixing plates 115a and 115b are superposed on the fixing plates of the intermediate girder 114. As shown in FIG. 1A, the outdoor heat exchanger apparatus 31 and the radiator 53 are integrated maintaining the interval 101 between them by superposing and screwing together the ribs of the end plates 110 and 111 of the outdoor heat exchanger apparatus 31 and the end plates 112 and 113 of the radiator 53, and by fixing and screwing the fixing plates 115a and 115b of the intermediate girder 115 and the fixing plates of the intermediate girder 114 using screws 117 and 117.

Below, the components of the GHP 1 will be explained by classifying the operations of the GHP 1 into a heating operation and a cooling operation.

First, the components of the GHP 1 during the cooling operation will be explained. During the cooling operation, the four-way valve 35 connects the compressor 33 and the outdoor heat exchanger apparatus 31, and connects the indoor heat exchanger apparatus 11 and the accumulator 34. The flow direction of the refrigerant during the cooling operation is shown by an arrow with a solid line in FIG. 2. As shown in FIG. 2, a gas refrigerant of high temperature and high pressure, which is discharged from the compressor 33, flows into the outdoor heat exchanger apparatus 31. Moreover, the three-way valves 38 and 38 make the refrigerant pass through the by-pass circuit 30a, in order to prevent the refrigerant from passing through the water heat exchanger apparatus 32 during the cooling operation.

The gas refrigerant of high temperature and high pressure discharges heat into the outdoor air and is condensed in the outdoor heat exchanger apparatus 31, and it becomes a liquid refrigerant of high temperature and high pressure. Then, the liquid refrigerant of high temperature and high pressure is decompressed when the refrigerant passes through the expansion valve 37, and it becomes a liquid refrigerant of low temperature and low pressure. Thereafter, the liquid refrigerant is sent into the indoor unit 10.

The liquid refrigerant of low temperature and low pressure absorbs heat from the indoor air, and is vaporized in the indoor heat exchanger apparatus 11. Thereby, the chamber is cooled and the liquid refrigerant becomes a gas refrigerant of low temperature and low pressure. Then, the gas refrigerant is sent into the refrigerant circuit 30 in the outdoor unit 20.

The refrigerant passes through the four-way valve 35, and flows into the accumulator 34. When the refrigerant contains a liquid component, the liquid component is separated out in the accumulator 34. The gas refrigerant containing no liquid component flows into the compressor 33. The gas refrigerant is compressed in the compressor 33, and then it becomes a gas refrigerant of high temperature and high pressure. Thereafter, the gas refrigerant is sent into the outdoor heat exchanger apparatus 31 again.

As explained above, the outdoor heat exchanger apparatus 31 of the outdoor heat exchanger unit 100 acts as a condenser during the cooling operation. Namely, the outdoor heat exchanger apparatus 31 discharges heat of the refrigerant to the outdoor air introduced therein. Therefore, the waste heat of the gas engine 41 radiated from the radiator 53 causes adverse effects on the outdoor heat exchanger apparatus 31. In other words, when the outdoor heat exchanger apparatus 31, which acts as a condenser, is heated due to the waste heat of the gas engine 41, the pressure of the refrigerant of the refrigerant circuit 30 increases, and a large amount of electric power is required to drive the compressor. As a result, the COP of the GHP decreases. This is unsuitable for the cooling operation.

Figure 5A:
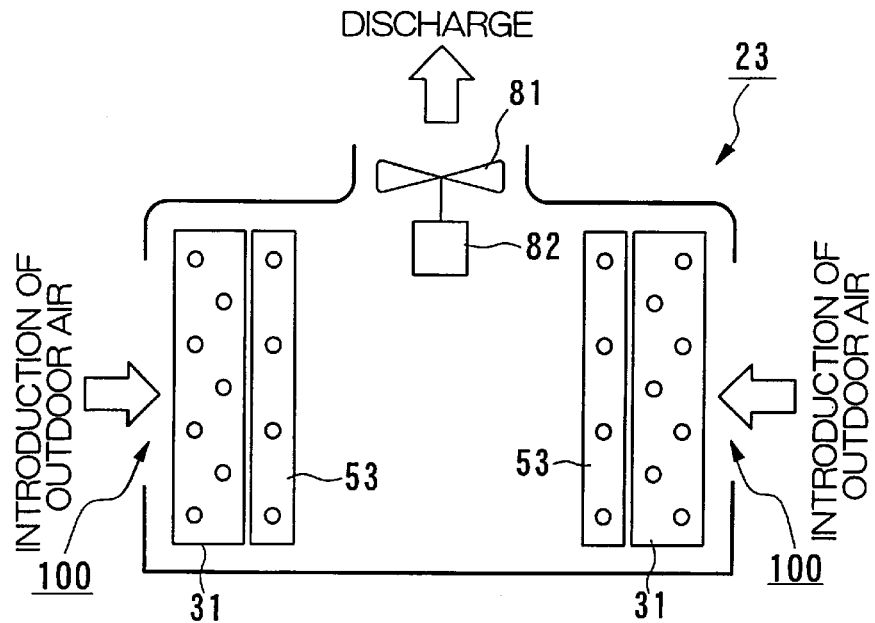
FIG. 5A shows an flow direction of the outdoor air in the outdoor heat exchanger unit in the cooling operation.

However, the radiator 53 is positioned at the downstream side with respect to the outdoor heat exchanger apparatus 31 in the flow direction of the introduced outdoor air as shown in FIG. 5A in this embodiment. During the cooling operation, the outdoor fan 81 rotates in a normal mode. That is, the outdoor fan 81 rotates so as to draw in the outdoor air from both sides of the heat exchange chamber 23, and discharges the outdoor air from the opening 84 formed at the ceiling. Due to this, the outdoor air heated by the radiator 53 does not pass through the outdoor heat exchanger apparatus 31. That is, the outdoor heat exchanger apparatus 31 is not heated by the outdoor air heated by the radiator 53. In addition, the interval 101 is between the fins 31a of the outdoor heat exchanger apparatus 31 and the fins 53a of the radiator 53; therefore, heat is not conducted between the outdoor heat exchanger apparatus 31 and the radiator 53. As a result, it is possible to prevent the outdoor heat exchanger apparatus 31 from being effected by adverse effects of the waste heat of the gas engine 41.

In the outdoor heat exchanger unit 100, the outdoor heat exchanger apparatus 31, which acts as a condenser, does not absorb the waste heat from the radiator 53, and the pressure in the refrigerant cycle does not increase. Therefore, a large amount of electric power is not required to drive the compressor 33, and the COP of the GHP can be improved.

Moreover, the outdoor heat exchanger apparatus 31 is not effected by adverse effects of the radiator 53, and it can have a small size. The manufacturing cost can be reduced, and the GHP can also have a small size.

Below, the components of the GHP 1 during the heating operation will be explained. During the heating operation, the four-way valve 35 connects the compressor 33 and the indoor heat exchanger apparatus 11, and connects the outdoor heat exchanger apparatus 31 and the accumulator 34. The flow direction of the refrigerant during the heating operation is shown by an arrow with a broken line in FIG. 2. As shown in FIG. 2, a gas refrigerant of high temperature and high pressure, which is discharged from the compressor 33, flows into the indoor heat exchanger apparatus 11 of the indoor unit 10.

The gas refrigerant of high temperature and high pressure discharges heat into the indoor air, and it is condensed and becomes a liquid refrigerant of high temperature and high pressure in the indoor heat exchanger apparatus 11. Thereby, the camber is heated. Then, the liquid refrigerant of high temperature and high pressure is sent into the refrigerant circuit 30 in the outdoor unit 20. The liquid refrigerant flows into the outdoor heat exchanger apparatus 31. The liquid refrigerant of high temperature and high pressure absorbs heat from the outdoor air and is evaporated; then it becomes a gas refrigerant of low temperature and low pressure.

Moreover, the three-way valves 38 and 38 make the refrigerant pass through the water heat exchanger apparatus 32 during the heating operation. Therefore, the gas refrigerant of low temperature and low pressure flows into the water heat exchanger apparatus 32, and exchanges heat with the cooling water of the gas engine 41. Thereby the gas refrigerant of low temperature and low pressure becomes a gas refrigerant of high temperature and high pressure. The refrigerant flows into the accumulator 34. When the refrigerant contains a liquid component, the liquid component is separated out in the accumulator 34. The gas refrigerant containing no liquid component flows into the compressor 33. The gas refrigerant is compressed in the compressor 33, and then it becomes a gas refrigerant of high temperature and high pressure. Thereafter, the gas refrigerant is sent into the indoor heat exchanger apparatus 11 again.

During the heating operation, when the temperature of the outdoor air is relatively high, the refrigerant can absorb heat from the outdoor air sufficient for evaporation in the outdoor heat exchanger apparatus 31, and problems do not particularly arise. However, when the temperature of the outdoor air is low, for example when the GHP 1 is used in a cold region, it is difficult for the refrigerant to absorb heat sufficiently from the outdoor air. Therefore, the heating ability sometimes decreases. In particular, the outdoor air passes through the outdoor heat exchanger apparatus 31 and then passes through the radiator 53; the outdoor heat exchanger apparatus 31 and the radiator 53 are separated in this embodiment. Therefore, the waste heat of the gas engine 41 does not effect the outdoor heat exchanger apparatus 31. Namely, the waste heat of the gas engine 41 cannot be utilized in this embodiment.

Figure 5B:
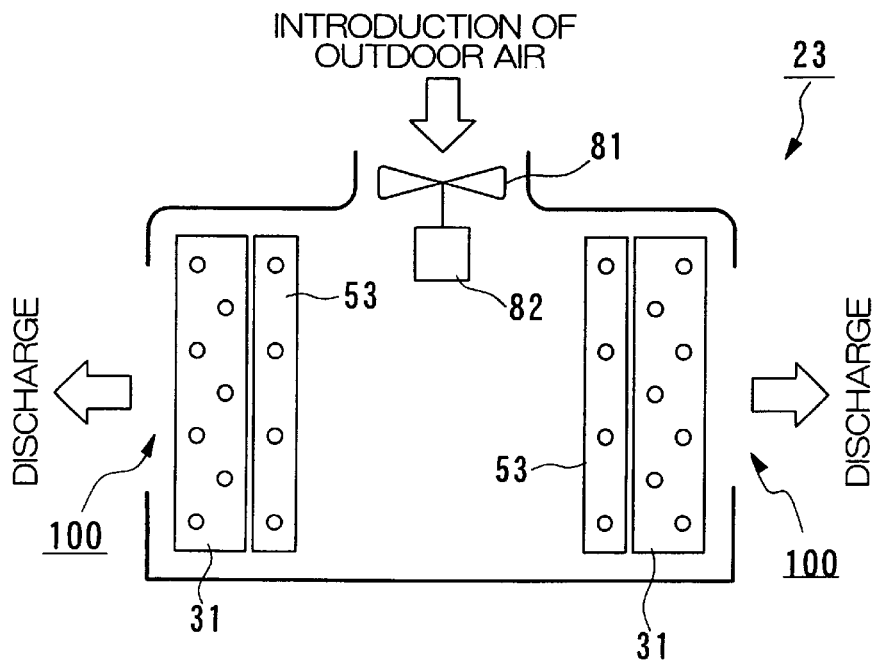
FIG. 5B shows an flow direction of the outdoor air in the outdoor heat exchanger unit in the heating operation.

When the temperature of the outdoor air is low and the GHP performs the heating operation, the outdoor fan 81 rotates in a reverse mode. That is, the outdoor fan 81 rotates so as to introduce the outdoor air into the heat exchange chamber 23 from the opening 84 formed at the ceiling, as shown in FIG. 5B. The outdoor air, which is introduced into the heat exchange chamber 23, passes through the radiator 53 and the outdoor heat exchanger apparatus 31 in turn, and it is discharged from both sides of the heat exchange chamber 23.

Due to this, the outdoor air is heated by the waste heat of the gas engine 41 when it passes through the radiator 53. The heated outdoor air flows into the outdoor heat exchanger apparatus 31, and exchanges heat with the refrigerant. Therefore, even when the temperature of the outdoor air is low, the refrigerant can absorb heat sufficient for evaporation from the outdoor air. That is, the waste heat of the gas engine 41 can be utilized, and thereby the heating ability can be improved.

Moreover, the rotation direction of the outdoor fan 81 may be changed in response to the temperature of the outdoor air, in addition to the heating operation conditions.

Furthermore, when the GHP 1 comprises the water heat exchanger apparatus 32, the expansion valve 37, which is positioned between the indoor heat exchanger apparatus 11 and the outdoor heat exchanger apparatus, is preferably a constant pressure expansion valve. When the expansion valve 37 is a constant pressure expansion valve, a pressure decrease in the circulating refrigerant can be prevented. In other words, when the temperature of the outdoor air is low, the efficiency of the gas engine 41 is improved, and thereby the waste heat of the gas engine 41 decreases; a pressure decrease in the circulating refrigerant can be prevented. Consequently, a temperature decrease in the refrigerant can be prevented. Therefore, frost of the outdoor heat exchanger apparatus 31 can be prevented by using a constant pressure expansion valve. As a result, a decrease in the heating ability can be prevented.

Below a second embodiment of the GHP according to the present invention will be explained referring to FIG. 7.

FIG. 7 shows the main components comprising the refrigerant circuit 30 and the gas engine portion 40, which belong to the outdoor unit 20, and the indoor heat exchanger apparatus 11. An outdoor heat exchanger apparatus 31A, which comprises three heat exchangers arranged in series in the flow direction of the outdoor air introduced into an outdoor heat exchanger unit 100A, is provided in the GHP 1 of this embodiment.

A heat exchanger, which is centered in the outdoor heat exchanger apparatus 31A, is a warm water heat exchanger 120, and belongs to the cooling water system 50. The remaining two heat exchangers, which sandwich the warm water heat exchanger 120, are refrigerant heat exchangers 121 and 121, and belongs to the refrigerant circuit 30.

The outdoor heat exchanger apparatus 31A is arranged upstream with respect to the radiator 53 in the flow direction of the air introduced in the outdoor heat exchanger unit 100A. Moreover, the interval 101 is between the outdoor heat exchanger apparatus 31A and the radiator 53.

A valve 122 for selectively introducing the cooling water of the gas engine 41 into the warm water heat exchanger 120 is arranged upstream with respect to the warm water heat exchanger 120 in the flow direction of the cooling water of the gas engine 41. Namely, the valve 122 is arranged between the gas engine 41 and the outdoor heat exchanger apparatus 31A. In particular, an electrical valve is suitably used as the valve 122.

During the cooling operation, the valve 122 is closed, and thereby the cooling water for the gas engine 41 passes through only the radiator 53. Namely, the cooling water for the gas engine 41 does not pass through the warm water heat exchanger 120. As a result, only the refrigerant heat exchangers 121 and 121 act as a heat exchanger. In other words, the radiator 53 and the refrigerant heat exchangers 121 and 121, which are shown in FIG. 7, function similarly to the outdoor heat exchanger apparatus 31 and the radiator 53, which are shown in FIG. 1.

The outside air passes through the outdoor heat exchanger apparatus 31A and then passes through the radiator 53, and the interval 101 is between the outdoor heat exchanger apparatus 31A and the radiator 53; therefore, the outdoor heat exchanger apparatus 31A is not effected by adverse effects of the waste heat radiated from the radiator 53.

During the heating operation, the valve 122 is opened, and thereby the cooling water for the gas engine 41 passes through the radiator 53 and the warm water heat exchanger 120. The refrigerant heat exchangers 121 and 121 are heated by the cooling water at a high temperature, which passes through the warm water heat exchanger 120. Therefore, even when the temperature of the outdoor air is low, the refrigerant can absorb heat sufficient for evaporation from the waste heat of the cooling water for the gas engine 41.

Moreover, the valve 122 is operated in response to the heating operation or the cooling operation, as explained above. However, the valve 122 may be operated in response to whether or not the refrigerant heat exchangers 121 and 121 are frosted. That is, the valve 122 can be operated depending on the temperature of the outside air, the temperature of the outdoor heat exchanger apparatus 31A, etc.

Furthermore, this embodiment adopted the outdoor heat exchanger apparatus 31A comprising three heat exchangers, but the outdoor heat exchanger apparatus 31A is not restricted to three heat exchangers.

What is claimed is:

1. An outdoor unit for a gas heat pump type air conditioner, in which a compressor for compressing a refrigerant is driven by a gas engine, and which comprises a heat pump for utilizing waste heat of said gas engine to perform heating and cooling operations:

wherein said outdoor unit comprises a gas engine portion comprising said gas engine, a cooling water system comprising a radiator, an exhaust gas system for introducing exhaust gas discharged from said gas engine outside of said outdoor unit, and a fuel intake system for supplying fuel and air in said gas engine; and a refrigerant circuit comprising said compressor, an outdoor heat exchanger apparatus for exchanging heat between said refrigerant and air introduced therein, and an expansion valve for decompressing and expanding said refrigerant in a liquid state during the cooling operation, wherein said radiator is connected in said cooling water system without a valve; and an outdoor heat exchanger unit is provided in said outdoor unit in which said radiator and said outdoor heat exchanger apparatus are arranged in series in the flow direction of an outdoor air introduced in said outdoor heat exchanger unit; said radiator is positioned downstream with respect to said outdoor heat exchanger apparatus in the flow direction of an outdoor air introduced in said outdoor heat exchanger unit; and an interval is between said radiator and said outdoor heat exchanger apparatus;

wherein said outdoor heat exchanger apparatus comprises at least three heat exchangers arranged in series in the flow direction of outdoor air introduced into said outdoor heat exchanger unit, at least one heat exchanger which is not arranged at both sides of said outdoor heat exchanger apparatus is a warm water heat exchanger belonging to said cooling water system, and said cooling water system further comprises a further valve for selectively introducing cooling water of said gas engine into said warm water heat exchanger, wherein said radiator is connected in said cooling water system so as to receive cooling water simultaneously with said warm water heat exchanger.

2. A gas heat pump type air conditioner, in which a compressor for compressing a refrigerant is driven by a gas engine, and which comprises a heat pump for utilizing waste heat of said gas engine to perform heating and cooling operations:

wherein said gas heat pump type air conditioner comprises an outdoor unit and an indoor unit;

said outdoor unit comprises a gas engine portion comprising said gas engine, a cooling water system comprising a radiator, an exhaust gas system for introducing exhaust gas discharged from said gas engine outside of said outdoor unit, and a fuel intake system for supplying fuel and air in said gas engine; a refrigerant circuit comprising said compressor, an outdoor heat exchanger apparatus for exchanging heat between said refrigerant and air introduced therein, and an expansion valve for decompressing and expanding said refrigerant in a liquid state during the cooling operation, wherein said radiator is connected in said cooling water system without a valve;

an outdoor heat exchanger unit is provided in said outdoor unit, in which said radiator and said outdoor heat exchanger apparatus are arranged in series in the flow direction of an outdoor air introduced in said outdoor heat exchanger unit; said radiator is positioned downstream with respect to said outdoor heat exchanger apparatus in the flow direction of an outdoor air introduced in said outdoor heat exchanger unit; and an interval is between said radiator and said outdoor heat exchanger apparatus; wherein said outdoor heat exchanger apparatus comprises at least three heat exchangers arranged in series in the flow direction of outdoor air introduced into said outdoor heat exchanger unit, at least one heat exchanger which is not arranged at both sides of said outdoor heat exchanger apparatus is a warm water heat exchanger belonging to said cooling water system, and said cooling water system further comprises a further valve for selectively introducing cooling water of said gas engine into said warm water heat exchanger, wherein said radiator is connected in said cooling water system so as to receive cooling water simultaneously with said warm water heat exchanger; and an indoor unit comprises a fan for drawing indoor air and blowing out it front an opening, and an indoor heat exchanger apparatus for exchanging heat between said refrigerant supplied from said outdoor unit and said indoor air drawn by said fan.

3. A gas heat pump type air conditioner according to claim 2, further comprising a water heat exchanger apparatus for absorbing waste heat of said gas engine from cooling water circulating in said cooling water system and evaporating said refrigerant; and a constant pressure expansion valve is used as said expansion valve.

4. A gas heat pump type air conditioner according to claim 2, wherein said further valve is operated so as to introduce said cooling water into said warm water heat exchanger depending on conditions under which frost is generated in said outdoor heat exchanger apparatus during the heating operation and temperature of outdoor air is low.

5. An outdoor unit for a gas heat pump air conditioner, comprising:

a combustion engine having a cooling liquid system including a radiator, wherein said radiator is connected in said cooling liquid system without a valve;

a compressor for compressing a refrigerant, said compressor being driven by said combustion engine;

a refrigerant circuit for circulating refrigerant compressed by said compressor, including a refrigerant expansion valve and a plurality of refrigerant heat exchangers; and an outdoor heat exchanger unit comprising:

an outdoor heat exchanger apparatus comprising a heat exchanger of said cooling liquid system positioned between heat exchangers of said plurality of refrigerant heat exchangers, said radiator positioned at an interval from said outdoor heat exchanger apparatus, a valve for selectively introducing cooling liquid of said combustion engine into said heat exchanger of said cooling liquid system, wherein said radiator is connected in said cooling liquid system so as to receive cooling liquid simultaneously with said heat exchanger of said cooling liquid system, and a fan positioned to cause outdoor air to flow in a direction such that said radiator is serially positioned downstream with respect to said outdoor heat exchanger apparatus in the flow direction of the outdoor air.

6. The outdoor unit for a gas heat pump air conditioner according to claim 5, wherein said outdoor heat exchanger apparatus comprises a plurality of fins, a plurality of refrigerant conduits connected to said fins, and a conduit of said cooling liquid system connected to said fins.

7. The outdoor unit for a gas heat pump air conditioner according to claim 6, wherein said radiator comprises a plurality of fins and a conduit of said cooling liquid system connected to said fins, wherein said interval is an interval between said fins of said outdoor heat exchanger apparatus and said fins of said radiator.

* * * * *